C. E. PARDRIDGE & O. H. HERTEL.
WHEEL.
APPLICATION FILED MAY 29, 1908.
937,385.
Patented Oct. 19, 1909.
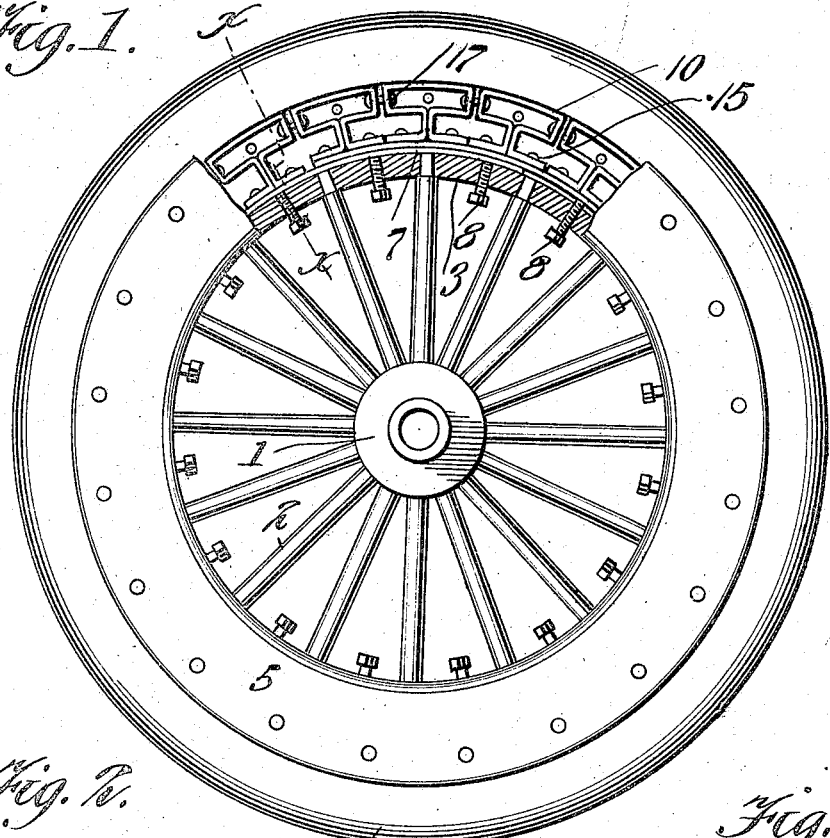
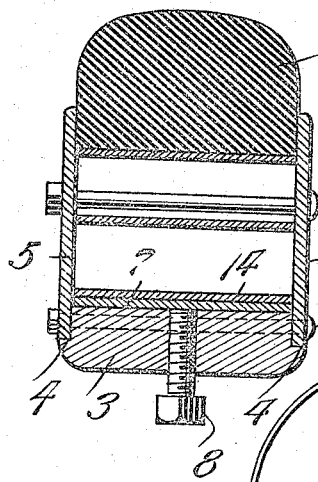
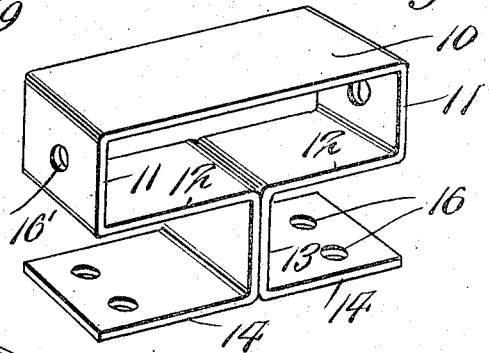
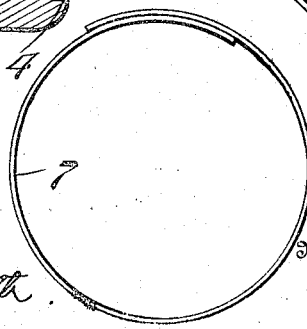
Witnesses:
Inventors
Otto H. Hertel,
Clinton E. Pardridge,
By Victor J. Evans
Attorney

UNITED STATES PATENT OFFICE.

CLINTON E. PARDRIDGE AND OTTO H. HERTEL, OF CHICAGO, ILLINOIS, ASSIGNORS OF ONE-THIRD TO EDWARD H. LAKEMAN, OF CHICAGO, ILLINOIS.

WHEEL.

937,385.

Specification of Letters Patent.

Patented Oct. 19, 1909.

Application filed May 29, 1908. Serial No. 435,666.

*To all whom it may concern:*

Be it known that we, CLINTON E. PARDRIDGE and OTTO H. HERTEL, citizens of the United States of America, residing at Chicago, in the county of Cook and State of Illinois, have invented new and useful Improvements in Wheels, of which the following is a specification.

This invention relates to wheels especially designed for use on motor-driven vehicles, such as automobiles, the invention relating particularly to the construction of the wheel rim and tire, whereby an ordinary solid rubber tire may be used in connection with the wheel rim, provision being made for imparting the desired elasticity or yielding action to the tire, making the same practically the equivalent of the ordinary pneumatic tire now in common use and doing away with the liability of puncturing.

A further object of the invention is to provide means whereby the tension on the tire may be increased or diminished, according to the exigencies of the case.

With the above and other objects in view, the nature of which will more fully appear as the description proceeds, the invention consists in the novel construction, combination and arrangement of parts hereinafter fully described, illustrated and claimed.

In the accompanying drawing,—Figure 1 is a side elevation, partly in section, of a wheel embodying the present invention. Fig. 2 is a cross section through the rim and tire. Fig. 3 is an enlarged detail perspective view of one of the spring members. Fig. 4 is an edge view of the tension band.

The wheel may embody a hub 1 and spokes 2 of any usual or preferred construction, while the rim 3 may be of metal or wood, according to the desire of the manufacturer. In carrying out the present invention, the rim 3 is rabbeted along its side edges, as shown at 4, to receive the oppositely arranged annular side plates 5 which are secured to the rim by bolts 6 or their equivalent. Between the plates and lying closely adjacent to or in contact with the rim 3 is a tension band 7 which is made greater than a circle so as to allow the ends thereof to overlap each other, as clearly shown in Fig. 4, thus providing for the expansion of said band, which is effected by means of a circular series of expanding screws 8 which are inserted through the rim from the inner side, as shown in Figs. 1 and 2, and bear at their outer ends against the inner surface of the band. By turning the screws 8 the tension band 7 may be expanded or allowed to contract by its own resiliency.

9 designates the tread or tire, the inner portion of which is confined between the side plates 5, as best illustrated in Fig. 2. Said tire or tread may be of rubber or any other suitable material, rubber being preferred. The tire is also solid in cross section. Between the inner flat surface of the tire 9 and the tension band 7 there is interposed a circular spring made up of a circular series of spring sections, as shown in Fig. 1, each section being shaped as illustrated in detail in Fig. 3, wherein it is seen to comprise an outer flat portion 10, right-angular or radially disposed end portions 11, inwardly extending return portions 12, radially disposed parallel portions 13, which are arranged close together or in actual contact, and outwardly and oppositely extending end portions or terminals 14 which lie flatwise against the tension band 7 and may be secured thereto by passing bolts, rivets or other fasteners 15 through openings 16 in the end portions 14 and also through corresponding holes in the tension band 7. In this way all of the spring sections are secured to and carried by the tension band and are movable outward and inward therewith when said tension band is expanded by means of the screws 8. The end portions 11 of the spring sections may also be provided with holes 16' to receive coupling pins or connections 17, as shown in Figs. 1 and 3, but it will, of course, be understood that where the springs are connected by fasteners 17, such fasteners will be left sufficiently loose to allow the necessary relative play between the spring sections and accommodate the expansion of the tension band 7 and the outward movement of the spring sections incident to the expansion of the tension band.

By means of the construction above described, it will be seen that the spring sections may be placed under any desired tension by means of the expanding screws 8 in order to accommodate the tire and wheel to the load to be imposed thereon and in accordance with other requirements or conditions which may arise.

Having thus described the invention, what is claimed as new, is:—

The combination with a wheel rim, of annular side plates carried thereby and extending outward beyond the rim, a tire having the inner portion thereof included between said plates, and a circular series of spring sections interposed between the rim and tire, each of said sections embodying curved outer and inner intermediate concentric portions, and straight radially disposed connecting portions therefor arranged out of radial alinement with each other, the outer straight radial portions of the springs lying side-by-side and being connected to one another.

In testimony whereof we affix our signatures in presence of two witnesses.

CLINTON E. PARDRIDGE.
OTTO H. HERTEL.

Witnesses.
W. BROWN,
JAMES I. WHALEN.